United States Patent
Tapley et al.

(10) Patent No.: US 9,495,386 B2
(45) Date of Patent: Nov. 15, 2016

(54) IDENTIFICATION OF ITEMS DEPICTED IN IMAGES

(75) Inventors: John Tapley, Campbell, CA (US); Eric J. Farraro, Santa Clara, CA (US); Raghav Gupta, Sunnyvale, CA (US); Roopnath Grandhi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 545 days.

(21) Appl. No.: 12/371,882

(22) Filed: Feb. 16, 2009

(65) Prior Publication Data

US 2009/0304267 A1     Dec. 10, 2009

Related U.S. Application Data (60) Provisional application No. 61/106,916, filed on Oct. 20, 2008, provisional application No. 61/033,940, filed on Mar. 5, 2008.

(51) Int. Cl.
*G06F 17/30* (2006.01)
*G06T 7/00* (2006.01)
(Continued)

(52) U.S. Cl.
CPC ....... *G06F 17/30256* (2013.01); *G06F 3/0484* (2013.01); *G06F 17/248* (2013.01);
(Continued)

(58) Field of Classification Search
CPC ............... G06F 17/2247; G06F 17/211; G06F 3/048; G06F 3/0481; G06F 3/0482; G06F 3/04842; G06F 17/30017; G06F 17/30058; G06F 17/30244; G06F 17/30247; G06F 17/30256; G06F
(Continued)

(56) References Cited

U.S. PATENT DOCUMENTS 5,068,723 A   11/1991   Dixit
5,546,475 A   8/1996    Bolle et al.
(Continued)

FOREIGN PATENT DOCUMENTS

| CN | 102667913 A | 9/2012 |
|---|---|---|
| WO | WO-2011087797 A2 | 7/2011 |
| WO | WO-2011087797 A3 | 7/2011 |

OTHER PUBLICATIONS

J.R. Parker, Algorithms for Image Processing and Computer Vision, 1997, Wiley Computer Publishing, pp. 23-29.*
(Continued)

*Primary Examiner* — Nicholas Ulrich
(74) *Attorney, Agent, or Firm* — Schwegman, Lundberg & Woessner, P.A.

(57) ABSTRACT

In an example embodiment, a method of identifying an item depicted in an image is provided. In this method, the image depicting the item is accessed; in addition, other images and their item identifiers are also accessed. A match of the image with one of the other images is identified. The match can be based on a variety of matching techniques, such as the application of an edge detection algorithm and the conversion of the images into color histograms. With a match, the image is then associated with an item identifier of the matched image. In one example, a template associated with one of the item identifiers can be accessed.

15 Claims, 10 Drawing Sheets

(51) Int. Cl.
*G06Q 30/06* (2012.01)
*G06F 17/24* (2006.01)
*G06F 3/0484* (2013.01)
*G06K 9/46* (2006.01)

(52) U.S. Cl.
CPC ..... *G06F 17/3025* (2013.01); *G06F 17/30047* (2013.01); *G06K 9/4652* (2013.01); *G06Q 30/0601* (2013.01); *G06T 7/0085* (2013.01)

(58) Field of Classification Search
CPC ................ 17/30259;G06F 17/3025; G06F 17/30047; G06F 3/005; G06T 5/40; G06T 7/0079; G06T 7/0085; H04N 21/4666; G06K 9/46; G06K 9/4604; G06K 9/4609; G06K 9/4642; G06K 9/4652
See application file for complete search history.

(56) References Cited

U.S. PATENT DOCUMENTS

| | | | |
|---|---|---|---|
| 5,579,471 A * | 11/1996 | Barber et al. | 715/700 |
| 5,692,012 A | 11/1997 | Virtamo et al. | |
| 5,781,899 A | 7/1998 | Hirata | |
| 5,802,361 A | 9/1998 | Wang et al. | |
| 5,818,964 A | 10/1998 | Itoh | |
| 5,870,149 A | 2/1999 | Comroe et al. | |
| 5,889,896 A | 3/1999 | Meshinsky et al. | |
| 5,949,429 A | 9/1999 | Bonneau et al. | |
| 6,134,548 A | 10/2000 | Gottsman | |
| 6,151,587 A | 11/2000 | Matthias | |
| 6,154,738 A * | 11/2000 | Call | G06Q 20/201 705/20 |
| 6,157,435 A | 12/2000 | Slater et al. | |
| 6,216,227 B1 | 4/2001 | Goldstein et al. | |
| 6,278,446 B1 * | 8/2001 | Liou et al. | 715/700 |
| 6,292,593 B1 | 9/2001 | Nako et al. | |
| 6,463,426 B1 | 10/2002 | Lipson et al. | |
| 6,477,269 B1 * | 11/2002 | Brechner | 382/165 |
| 6,483,570 B1 | 11/2002 | Slater et al. | |
| 6,484,130 B2 | 11/2002 | Dwyer et al. | |
| 6,512,919 B2 | 1/2003 | Ogasawara | |
| 6,530,521 B1 | 3/2003 | Henry | |
| 6,549,913 B1 | 4/2003 | Murakawa | |
| 6,563,959 B1 | 5/2003 | Troyanker | |
| 6,589,290 B1 * | 7/2003 | Maxwell et al. | 715/224 |
| 6,642,929 B1 | 11/2003 | Essafi et al. | |
| 6,724,930 B1 | 4/2004 | Kosaka et al. | |
| 6,763,148 B1 * | 7/2004 | Sternberg et al. | 382/293 |
| 6,947,571 B1 | 9/2005 | Rhoads et al. | |
| 7,023,441 B2 | 4/2006 | Choi et al. | |
| 7,130,466 B2 * | 10/2006 | Seeber | 382/218 |
| 7,254,779 B1 | 8/2007 | Rezvani et al. | |
| 7,257,268 B2 | 8/2007 | Eichhorn et al. | |
| 7,281,018 B1 * | 10/2007 | Begun et al. | |
| 7,460,735 B1 * | 12/2008 | Rowley et al. | 382/305 |
| 7,478,143 B1 | 1/2009 | Friedman et al. | |
| 7,593,602 B2 | 9/2009 | Stentiford | |
| 7,702,185 B2 * | 4/2010 | Keating et al. | 382/305 |
| 7,801,893 B2 * | 9/2010 | Gulli' et al. | 707/737 |
| 7,890,386 B1 | 2/2011 | Reber | |
| 7,921,040 B2 | 4/2011 | Reber | |
| 7,933,811 B2 | 4/2011 | Reber | |
| 7,957,510 B2 | 6/2011 | Denney et al. | |
| 8,130,242 B2 * | 3/2012 | Cohen | 345/632 |
| 8,370,062 B1 | 2/2013 | Starenky et al. | |
| 8,385,646 B2 | 2/2013 | Lang et al. | |
| 8,825,660 B2 | 9/2014 | Chittar | |
| 9,164,577 B2 | 10/2015 | Tapley et al. | |
| 2001/0034668 A1 | 10/2001 | Whitworth | |
| 2001/0049636 A1 | 12/2001 | Hudda et al. | |
| 2002/0052709 A1 | 5/2002 | Akatsuka et al. | |
| 2002/0107737 A1 * | 8/2002 | Kaneko et al. | 705/14 |
| 2002/0146176 A1 | 10/2002 | Meyers | |
| 2003/0053706 A1 | 3/2003 | Hong et al. | |
| 2003/0085894 A1 | 5/2003 | Tatsumi | |
| 2003/0112260 A1 | 6/2003 | Gouzu | |
| 2003/0123026 A1 | 7/2003 | Abitbol et al. | |
| 2003/0130910 A1 | 7/2003 | Pickover et al. | |
| 2003/0147623 A1 | 8/2003 | Fletcher | |
| 2003/0208409 A1 | 11/2003 | Mault | |
| 2003/0231806 A1 | 12/2003 | Troyanker | |
| 2004/0019643 A1 | 1/2004 | Zirnstein, Jr. | |
| 2004/0046779 A1 | 3/2004 | Asano et al. | |
| 2004/0057627 A1 * | 3/2004 | Abe et al. | 382/243 |
| 2004/0133927 A1 | 7/2004 | Sternberg et al. | |
| 2004/0205286 A1 | 10/2004 | Bryant et al. | |
| 2005/0081161 A1 | 4/2005 | Macinnes et al. | |
| 2005/0084154 A1 | 4/2005 | Li et al. | |
| 2005/0151963 A1 | 7/2005 | Pulla et al. | |
| 2005/0162523 A1 | 7/2005 | Darrell et al. | |
| 2005/0193006 A1 | 9/2005 | Bandas et al. | |
| 2005/0283379 A1 | 12/2005 | Reber | |
| 2006/0012677 A1 | 1/2006 | Neven, Sr. et al. | |
| 2006/0013481 A1 | 1/2006 | Park et al. | |
| 2006/0015492 A1 * | 1/2006 | Keating et al. | 707/4 |
| 2006/0032916 A1 | 2/2006 | Mueller et al. | |
| 2006/0038833 A1 | 2/2006 | Mallinson et al. | |
| 2006/0071945 A1 | 4/2006 | Anabuki | |
| 2006/0120686 A1 | 6/2006 | Liebenow et al. | |
| 2006/0184013 A1 | 8/2006 | Emanuel et al. | |
| 2007/0005576 A1 | 1/2007 | Cutrell et al. | |
| 2007/0078846 A1 * | 4/2007 | Gulli et al. | 707/5 |
| 2007/0104348 A1 | 5/2007 | Cohen | |
| 2007/0122947 A1 | 5/2007 | Sakurai et al. | |
| 2007/0133947 A1 * | 6/2007 | Armitage et al. | 386/95 |
| 2007/0143082 A1 | 6/2007 | Degnan | |
| 2007/0230817 A1 | 10/2007 | Kokojima | |
| 2007/0300161 A1 | 12/2007 | Bhatia et al. | |
| 2008/0037877 A1 * | 2/2008 | Jia et al. | 382/224 |
| 2008/0046738 A1 | 2/2008 | Galloway et al. | |
| 2008/0071559 A1 | 3/2008 | Arrasvuori | |
| 2008/0074424 A1 | 3/2008 | Carignano | |
| 2008/0082426 A1 | 4/2008 | Gokturk et al. | |
| 2008/0142599 A1 | 6/2008 | Benillouche et al. | |
| 2008/0163379 A1 | 7/2008 | Robinson | |
| 2008/0170810 A1 | 7/2008 | Wu et al. | |
| 2008/0177640 A1 | 7/2008 | Gokturk et al. | |
| 2008/0201241 A1 | 8/2008 | Pecoraro | |
| 2008/0205755 A1 * | 8/2008 | Jackson | G06K 9/6212 382/168 |
| 2008/0205764 A1 * | 8/2008 | Iwai et al. | 382/190 |
| 2008/0240575 A1 * | 10/2008 | Panda et al. | 382/209 |
| 2008/0278778 A1 * | 11/2008 | Saino | 358/505 |
| 2008/0288338 A1 | 11/2008 | Wiseman et al. | |
| 2008/0288477 A1 | 11/2008 | Kim et al. | |
| 2009/0028435 A1 | 1/2009 | Wu et al. | |
| 2009/0028446 A1 | 1/2009 | Wu et al. | |
| 2009/0094260 A1 * | 4/2009 | Cheng et al. | 707/100 |
| 2009/0109240 A1 | 4/2009 | Englert et al. | |
| 2009/0235187 A1 | 9/2009 | Kim et al. | |
| 2009/0240735 A1 | 9/2009 | Grandhi et al. | |
| 2009/0245638 A1 | 10/2009 | Collier et al. | |
| 2009/0287587 A1 | 11/2009 | Bloebaum et al. | |
| 2009/0319887 A1 | 12/2009 | Waltman et al. | |
| 2009/0324100 A1 | 12/2009 | Kletter et al. | |
| 2009/0325554 A1 | 12/2009 | Reber | |
| 2010/0015960 A1 | 1/2010 | Reber | |
| 2010/0015961 A1 | 1/2010 | Reber | |
| 2010/0015962 A1 | 1/2010 | Reber | |
| 2010/0034469 A1 | 2/2010 | Thorpe et al. | |
| 2010/0037177 A1 | 2/2010 | Golsorkhi | |
| 2010/0045701 A1 | 2/2010 | Scott et al. | |
| 2010/0046842 A1 | 2/2010 | Conwell et al. | |
| 2010/0048290 A1 | 2/2010 | Baseley et al. | |
| 2010/0131714 A1 | 5/2010 | Chandrasekaran | |
| 2010/0171999 A1 | 7/2010 | Namikata et al. | |
| 2010/0214284 A1 | 8/2010 | Rieffel et al. | |
| 2010/0241650 A1 | 9/2010 | Chittar | |
| 2010/0260426 A1 | 10/2010 | Huang et al. | |
| 2010/0281417 A1 | 11/2010 | Yolleck et al. | |
| 2010/0287511 A1 | 11/2010 | Meier et al. | |
| 2011/0016487 A1 | 1/2011 | Chalozin et al. | |

(56) References Cited

U.S. PATENT DOCUMENTS

| | | |
|---|---|---|
| 2011/0029334 A1 | 2/2011 | Reber |
| 2011/0055054 A1 | 3/2011 | Glasson |
| 2011/0061011 A1 | 3/2011 | Hoguet |
| 2011/0148924 A1 | 6/2011 | Tapley et al. |
| 2011/0215138 A1 | 9/2011 | Crum |
| 2012/0165046 A1 | 6/2012 | Rhoads et al. |
| 2012/0192235 A1 | 7/2012 | Tapley et al. |
| 2012/0308077 A1 | 12/2012 | Tseng |
| 2013/0050218 A1 | 2/2013 | Beaver, III et al. |
| 2014/0007012 A1 | 1/2014 | Govande et al. |
| 2014/0372449 A1 | 12/2014 | Chittar |
| 2016/0019723 A1 | 1/2016 | Tapley et al. |

OTHER PUBLICATIONS

"S60 Camera Phones Get Image Recognition Technology", http://news.softpedia.com/news/S60-Camera-Phones-Get-Image-Recognition-Technology-46333.shtml, (Feb. 27, 2008), 2 pgs.

"SnapTell: Technology", http://web.archive.org/web/20071117023817/http://www.snaptell.com/technology/index.htm, (Nov. 17, 2007), 1 pg.

"The ESP Game", http://www.espgame.org/instructions.html, (Downloaded Nov. 13, 2007), 2 pgs.

Gonsalves, Antone, "Amazon Launches Experimental Mobile Shopping Feature", http://www.informationweek.com/news/internet/retail/showArticle.jhtml?articleID=212201750&subSection=News, (Dec. 3, 2008), 1 pg.

Patterson, Ben, "Amazon iPhone app takes snapshots, looks for a match", http://tech.yahoo.com/blogs/patterson/30983, (Dec. 3, 2008), 3 pgs.

Terada, S., "New cell phone services tap image-recognition technologies", http://search.japantimes.co.jp/cgi-bin/nb20070626a1.html, (Jun. 26, 2007), 3 pgs.

Von Ahn, Luis, et al., "Labeling images with a computer game", Proceedings of the SIGCHI Conference on Human Factors in Computing Systems, (2004), 319-326.

"U.S. Appl. No. 12/406,016 , Response filed Sep. 21, 2011 to Non Final Office Action mailed Jun. 21, 2011", 17 pgs.

"U.S. Appl. No. 12/398,957, Non Final Office Action mailed Jul. 29, 2011", 23 pgs.

"U.S. Appl. No. 12/406,016, Non Final Office Action mailed Jun. 21, 2011", 21 pgs.

"RedLaser—Impossibly Accurate Barcode Scanning", [Online] Retrieved from the Internet: http://redlaser.com/index.php Visited Jul. 8, 2011, 2 pgs.

"YouTube Occipitaihq, RedLaser 2.0: Realtime iPhone UPC barcode scanning", [Online] Retrieved from the Internet: http://www.youtube.com/watch?v=9_6k visited Jul. 8, 2011, (Jun. 16, 2009), 1 pg.

"U.S. Appl. No. 12/406,016, Response filed May 17, 2012 to Non Final Office Action mailed Feb. 29, 2012", 16 pgs.

"U.S. Appl. No. 12/406,016, Examiner Interview Summary mailed May 15, 2012", 3 pgs.

"U.S. Appl. No. 12/398,957, Response filed Dec. 29, 2011 to Non Final Office Action mailed Jul. 29, 2011", 15 pgs.

"U.S. Appl. No. 12/406,016, Final Office Action mailed Feb. 29, 2012", 25 pgs.

"U.S. Appl. No. 12/398,957, Non Final Office Action mailed Mar. 29, 2012", 23 pgs.

"U.S. Appl. No. 61/033,940, Application filed Mar. 5, 2008", 56 pgs.

"U.S. Appl. No. 12/398,957, Final Office Action mailed Nov. 7, 2012", 22 pgs.

"U.S. Appl. No. 12/398,957, Response filed Jul. 30, 2012 to Non Final Office Action mailed Mar. 29, 2012", 13 pgs.

"U.S. Appl. No. 12/644,957, Non Final Office Action mailed Mar. 18, 2013", 17 pgs.

"U.S. Appl. No. 12/644,957, Response filed Jun. 14, 2013 to Non Final Office Action mailed Mar. 18, 2013", 12 pgs.

"European Application Serial No. 10803429.9, Office Action mailed Aug. 22, 2012", 2 pgs.

"European Application Serial No. 10803429.9, Response filed Jan. 21, 2013 to Office Action mailed Aug. 22, 2012", 10 pgs.

"International Application Serial No. PCT/US2010/061628, International Preliminary Report on Patentability mailed Jul. 5, 2012", 6 pgs.

"International Application Serial No. PCT/US2010/061628, International Search Report mailed Aug. 12, 2011", 4 pgs.

"International Application Serial No. PCT/US2010/061628, Written Opinion mailed Aug. 12, 2011", 4 pgs.

"U.S. Appl. No. 12/398,957, Response filed Mar. 7, 2013 to Final Office Action mailed Nov. 7, 2012", 12 pgs.

"U.S. Appl. No. 12/398,957, Non Final Office Action mailed Sep. 19, 2013", 21 pgs.

"U.S. Appl. No. 12/406,016, Non Final Office Action mailed Oct. 2, 2013", 21 pgs.

"U.S. Appl. No. 12/644,957, Final Office Action mailed Aug. 26, 2013", 19 pgs.

"U.S. Appl. No. 12/644,957, Response filed Nov. 26, 2013 to Final Office Action mailed Aug. 26, 2013", 11 pgs.

"U.S. Appl. No. 12/398,957, Response filed Jan. 16, 2014 to Non Final Office Action mailed Sep. 19, 2013", 13 pgs.

"U.S. Appl. No. 12/406,016, Notice of Allowance mailed Apr. 28, 2014", 23 pgs.

"U.S. Appl. No. 12/406,016, Response filed Mar. 3, 2014 to Non Final Office Action mailed Oct. 2, 2013", 15 pgs.

"U.S. Appl. No. 12/644,957, Non Final Office Action mailed Mar. 7, 2014", 21 pgs.

"U.S. Appl. No. 13/537,482, Non Final Office Action mailed Jan. 6, 2014", 25 pgs.

"U.S. Appl. No. 13/537,482, Response filed Apr. 22, 2014 to Non Final Office Action mailed Jan. 6, 2014", 10 pgs.

Kan, et al., "Applying QR Code in Augmented Reality Applications", (Dec. 15, 2009), 1-6.

"U.S. Appl. No. 12/398,957, Appeal Brief filed Oct. 27, 2014", 32 pgs.

"U.S. Appl. No. 12/398,957, Applicant Interview Summary filed Jan. 19, 2015", 1 pg.

"U.S. Appl. No. 12/398,957, Examiner Interview Summary mailed Sep. 10, 2014", 4 pgs.

"U.S. Appl. No. 12/398,957, Examiners Answer mailed Jan. 14, 2015", 10 pgs.

"U.S. Appl. No. 12/398,957, Final Office Action mailed Jul. 18, 2014", 27 pgs.

"U.S. Appl. No. 12/398,957, Reply Brief filed Mar. 13, 2015", 9 pgs.

"U.S. Appl. No. 12/406,016, Notice of Allowability mailed Jun. 11, 2014", 19 pgs.

"U.S. Appl. No. 12/644,957, Examiner Interview Summary mailed Apr. 29, 2015", 3 pgs.

"U.S. Appl. No. 12/644,957, Examiner Interview Summary mailed Jun. 11, 2014", 3 pgs.

"U.S. Appl. No. 12/644,957, Examiner Interview Summary mailed Sep. 4, 2014", 3 pgs.

"U.S. Appl. No. 12/644,957, Final Office Action mailed Jul. 11, 2014", 25 pgs.

"U.S. Appl. No. 12/644,957, Non Final Office Action mailed Dec. 29, 2014", 20 pgs.

"U.S. Appl. No. 12/644,957, Response filed Apr. 29, 2015 to Non Final Office Action mailed Dec. 29, 2014", 13 pgs.

"U.S. Appl. No. 12/644,957, Response filed Jun. 9, 2014 to Non Final Office Action mailed Mar. 7, 2014", 13 pgs.

"U.S. Appl. No. 12/644,957, Response filed Sep. 30, 2014 to Final Office Action mailed Jul. 11, 2014", 14 pgs.

"U.S. Appl. No. 13/537,482, Final Office Action mailed May 8, 2014", 20 pgs.

"U.S. Appl. No. 13/537,482, Final Office Action mailed May 22, 2015", 32 pgs.

"U.S. Appl. No. 13/537,482, Non Final Office Action mailed Nov. 6, 2014", 24 pgs.

"U.S. Appl. No. 13/537,482, Response filed Apr. 6, 2015 to Non Final Office Action mailed Nov. 6, 2014", 8 pgs.

(56) References Cited

OTHER PUBLICATIONS

"U.S. Appl. No. 13/537,482, Response filed Sep. 8, 2014 to Final Office Action mailed May 8, 2014", 10 pgs.
"U.S. Appl. No. 14/473,809, Preliminary Amendment filed Oct. 3, 2014", 10 pgs.
Mello, John P, et al., "Pongr Giving Cell Phone Users Way to Make Money", [Online]. Retrieved from the Internet: <http://www.techhive.com/article/240209/pongr_giving_cell_phone_users_way_to_make_money.html.>, (Sep. 18, 2011), 2 pgs.
"U.S. Appl. No. 14/868,105, Preliminary Amendment filed Oct. 20, 2015", 8 pgs.
"U.S. Appl. No. 12/644,957, Notice of Allowance mailed Jan. 17, 2015", 20 pgs.
"U.S. Appl. No. 14/473,809, Non Final Office Action mailed Aug. 13, 2015", 21 pgs.
"U.S. Appl. No. 13/537,482, Response filed Nov. 23, 2015 to Final Office Action mailed May 22, 2015", 10 pgs.
"U.S. Appl. No. 14/473,809, Final Office Action mailed Apr. 14, 2016", 23 pgs.
"U.S. Appl. No. 14/473,809, Response filed Feb. 16, 2016 to Non Final Office Action mailed Aug. 13, 2015", 13 pgs.

\* cited by examiner

IDENTIFICATION OF ITEMS DEPICTED IN IMAGES

CROSS-REFERENCES TO RELATED APPLICATIONS

This application claims the benefit of U.S. Provisional Application No. 61/106,916, filed Oct. 20, 2008, and claims the benefit of U.S. Provisional No. 61/033,940, filed Mar. 5, 2008, the disclosures of which are incorporated herein by reference.

FIELD

The present disclosure relates generally to information retrieval. In an example embodiment, the disclosure relates to identification of items depicted in images.

BACKGROUND

Online shopping and auction websites provide a number of publishing, listing, and price-setting mechanisms whereby a seller may list or publish information concerning items for sale. A buyer can express interest in or indicate a desire to purchase such items by, for example, submitting a query to the website for use in a search of the requested items.

The accurate matching of a query to relevant items is currently a major challenge in the field of information retrieval. An example of such a challenge is that item descriptions tend to be short and are uniquely defined by the sellers. Buyers seeking to purchase the items might use a different vocabulary from the vocabulary used by the sellers to describe the items. As an example, an item identified in the title as a "garnet" does not match a query "January birthstone" submitted by a buyer, although garnet is known as the birthstone for January. As a result, online shopping and auction websites that use a conventional search engine to locate items may not effectively connect the buyers to the sellers and vice versa.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident. however, to those skilled in the art that embodiments of the inventive subject matter may be practiced without these specific details. In general, well-known instruction instances, protocols, structures and techniques have not been shown in detail.

The embodiments described herein provide techniques for identifying items depicted in images. Images depicting a variety of items are stored in a repository of, for example, a network-based publication system (e.g., an online shopping website and an online auction website). Users may submit these images for inclusion in item postings, advertisements, or other publications in the network-based publication system. As explained in more detail below, an item depicted in an image may be identified by matching the image with user submitted images stored in the repository. In some embodiments, as explained in more detail below, the match may be based on a comparison of the color histograms of the images.

Figure 1:
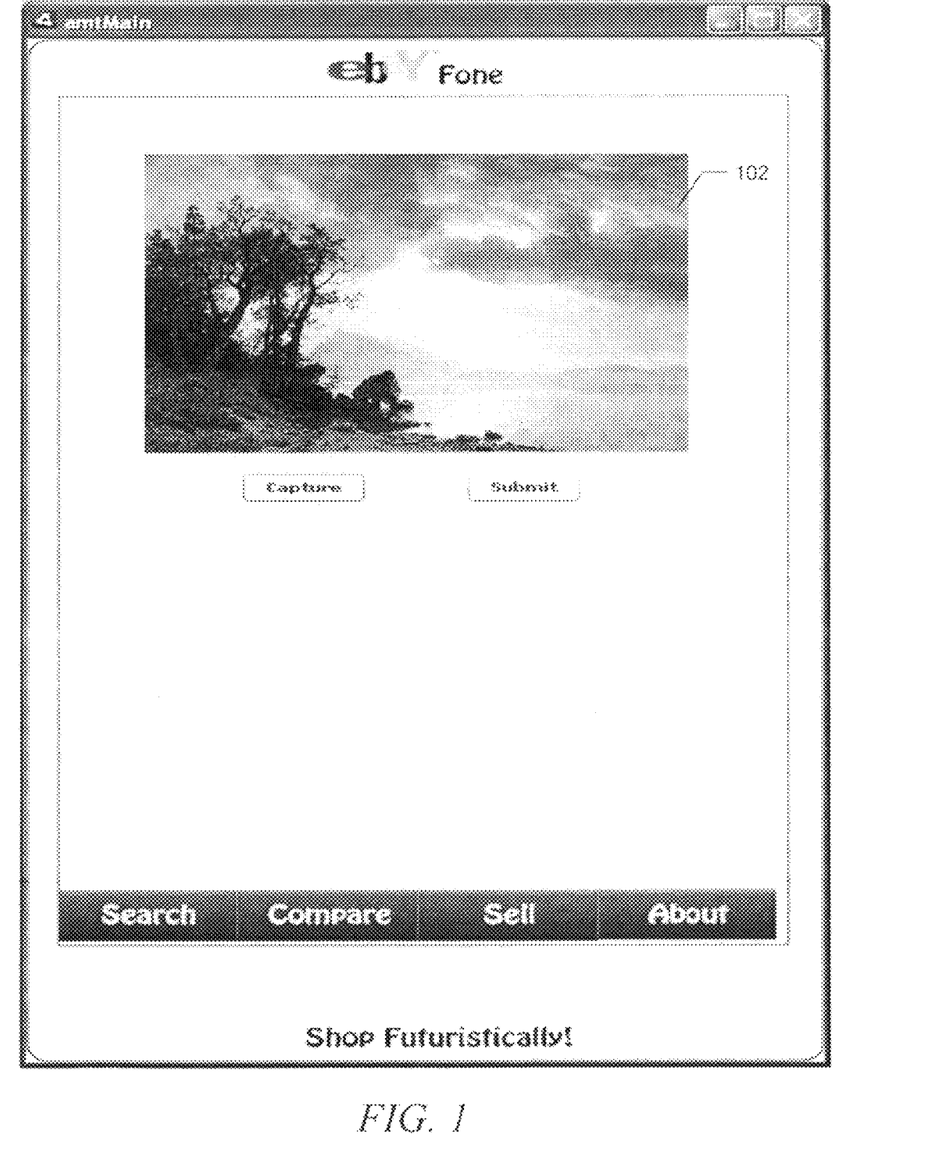
FIG. 1 is a user interface diagram showing an image that depicts an item, in accordance with an embodiment, that may be submitted for identification.
Figure 2:
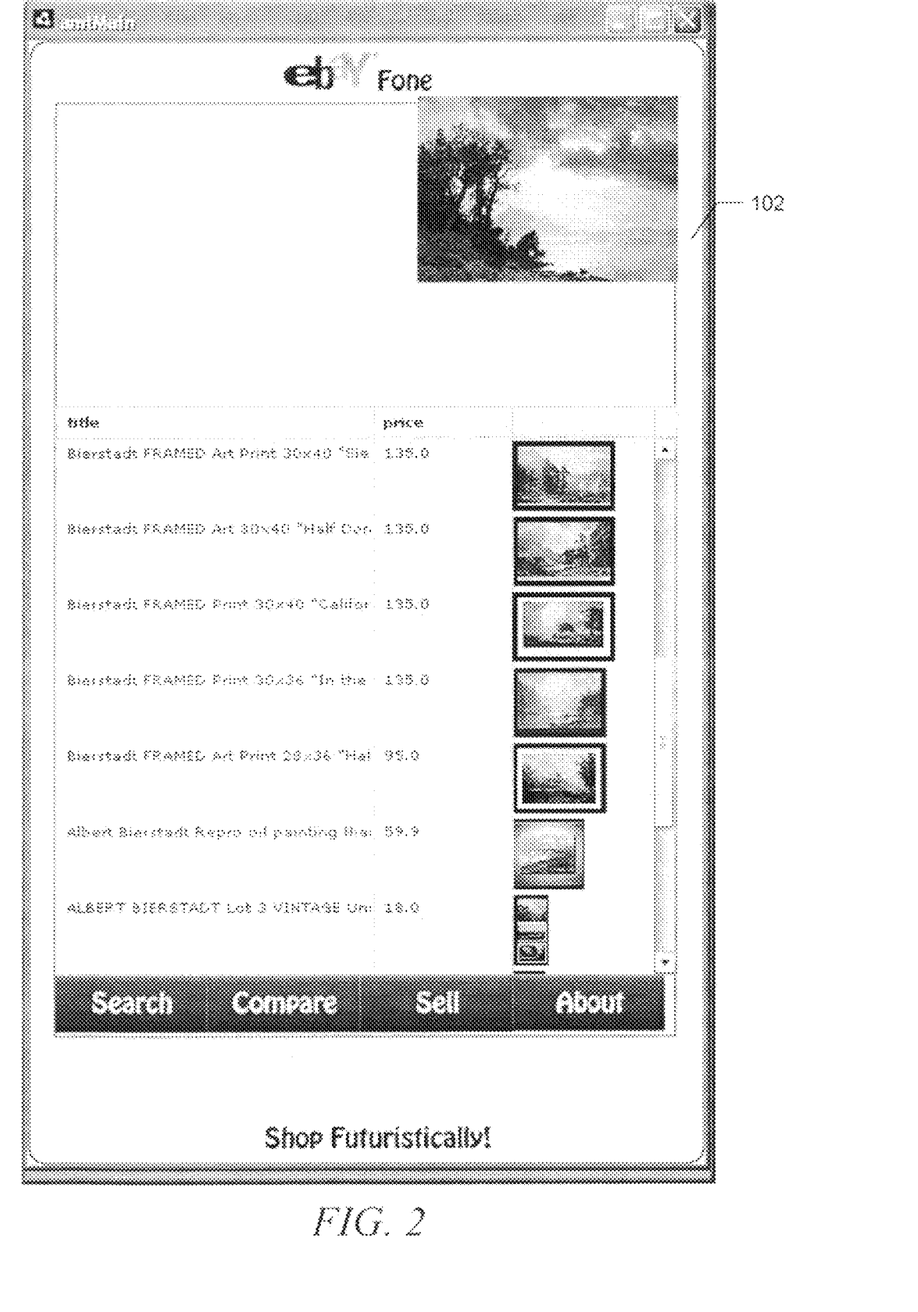
FIG. 2 is a user interface diagram showing a listing of items, in accordance with an embodiment, that match the item depicted in the image of FIG. 1.

FIG. 1 is a user interface diagram showing an image 102 that depicts an item, in accordance with an embodiment, that may be submitted for identification. As depicted, the image 102 is of a painting, and a user can shop for this painting by submitting this image 102 to, for example, an online shopping website. This online shopping website can identify the particular painting depicted in the image 102 and search its inventory for the identified painting. As depicted in FIG. 2, the online shopping website found several other paintings that match the painting depicted in the image 102 and lists these paintings for sale. As a result, rather than submitting the name or description of the painting depicted in the image 102, a user can simply submit the image 102 of the painting to, for example, the online shopping website for identification. The submission of the image 102 of the painting may therefore be faster because a user can effectively submit the painting for sale with just "one click" of a button instead of typing in a name or description of the painting. Furthermore, a user can locate the painting depicted in the image without even knowing the name of the painting. The submission process can also be more accurate because, for example, it does not depend on the user's knowledge of the painting's name, which can be erroneous.

It should be noted that the submission of an image of an item (e.g., image 102 of the painting) for identification may be used in a variety of different applications. As used herein, an "item" refers to any tangible or intangible thing and/or something that has a distinct, separate existence from other things (e.g., goods, services, electronic files, web pages, electronic documents, and land). For example, in addition to a sale of the item, a user may submit an image of the item to a price comparison service, in accordance with an embodiment of the invention. This price comparison service can identify the item depicted in the image and deliver shopping comparison results associated with the item. In another embodiment, a user can submit an image to a search engine (e.g., Internet search engine or website search engine) and the search engine can then retrieve websites or other information associated with the item depicted in the image. In yet another embodiment, a user can submit the image to an online auction website that can identify the item depicted in the image and return a template associated with the item to the user such that the user may then modify the template, if necessary, for use in auctioning the item on the online auction website. A template is an electronic file or document with descriptions and layout information. For example, a template may be a document with a predesigned, customized format and structure, such as a fax template, a letter template, or sale template, which can be readily filled in with information.

Figure 3:
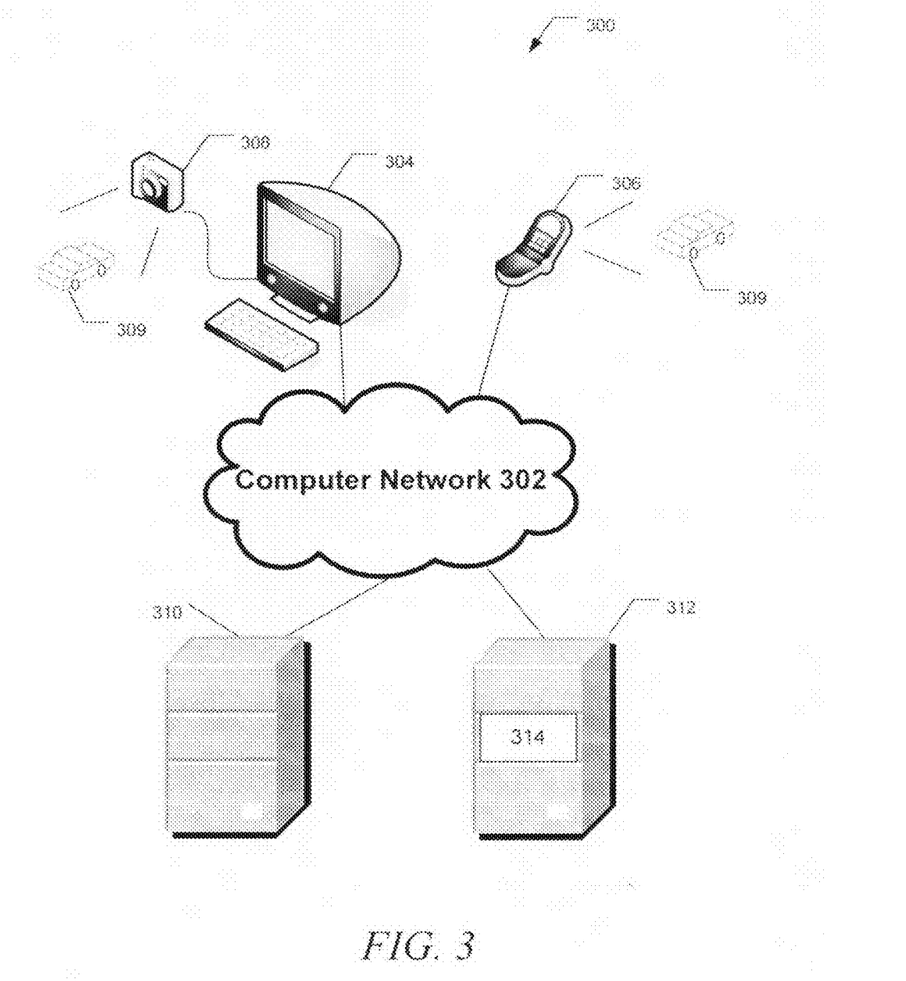
FIG. 3 is a diagram depicting a system, in accordance with an illustrative embodiment, for identifying items depicted in images.

FIG. 3 is a diagram depicting a system 300, in accordance with an illustrative embodiment, for identifying items depicted in images. As depicted, the system 300 includes client processing systems (e.g., personal computer 304 and mobile phone 306), a server 310 hosting a variety of services, and another server 312 hosting an item recognition module 314, which are all interconnected by way of a computer network 302. The computer network 302 is a collection of interconnected processing systems that communicate utilizing wired or wireless mediums. Examples of computer networks, such as the computer network 302, include Local Area Networks (LANs) and/or Wide-Area Networks (WANs), such as the Internet.

In the example of FIG. 3, a client processing system (e.g., personal computer 304 or mobile phone 306) transmits an image of an item 309 to the image recognition module 314, which is hosted on the server 312. The image may be captured by a camera built-in the mobile phone 306 or by a digital camera 308, which is configurable to download its stored images to the personal computer 304. Alternatively, the user may locate the image through, for example, the Internet or other image repositories.

The image recognition module 314 accesses the image from the client processing systems and, as explained in more detail below, identifies the item 309 depicted in the image with an item identifier. An "item identifier," as used herein, refers to a variety of values (e.g., alphanumeric characters and symbols) that establish the identity of or uniquely identify one or more items, such as item 309. For example, the item identifier can be a name assigned to the item 309. In another example, the item identifier can be a barcode value (e.g., Universal Product Code (UPC)) assigned to the item 309. In yet another example, the item identifier can be a title or description assigned to the item 309.

In an embodiment, the item recognition module 314 may then transmit the item identifier to a service hosted on the server 310 to locate item data. The "item data," as used herein, refer to a variety of data regarding one or more items depicted in an image that are posted or associated with the image. Such item data, for example, may be stored with the images or at other locations. Examples of item data include titles included in item listings, descriptions of items included in item listings, locations of the items, prices of the items, quantities of the items, availability of the items, a count of the items, templates associated with the items, and other item data. The type of item data requested by the item recognition module 314 depends on the type of service being accessed. Examples of services include online auction websites, online shopping websites, and Internet search engines (or website search engines). It should be appreciated that the item recognition module 314 may access a variety of different services by way of, for example, a Web-exposed application program interface (API). In an alternate embodiment, the item recognition module 314 may be embodied with the service itself where, for example, the item recognition module 314 may be hosted in the server 310 with the other services.

The system 300 may also include a global positioning system (not shown) that may be attached to or included in the client processing systems. The client processing systems can transmit the coordinates or location identified by the global positioning system to the services hosted on server 310 and, for example, the services can use the coordinates to locate nearby stores that sell the item 309 depicted in the image.

Figure 4:
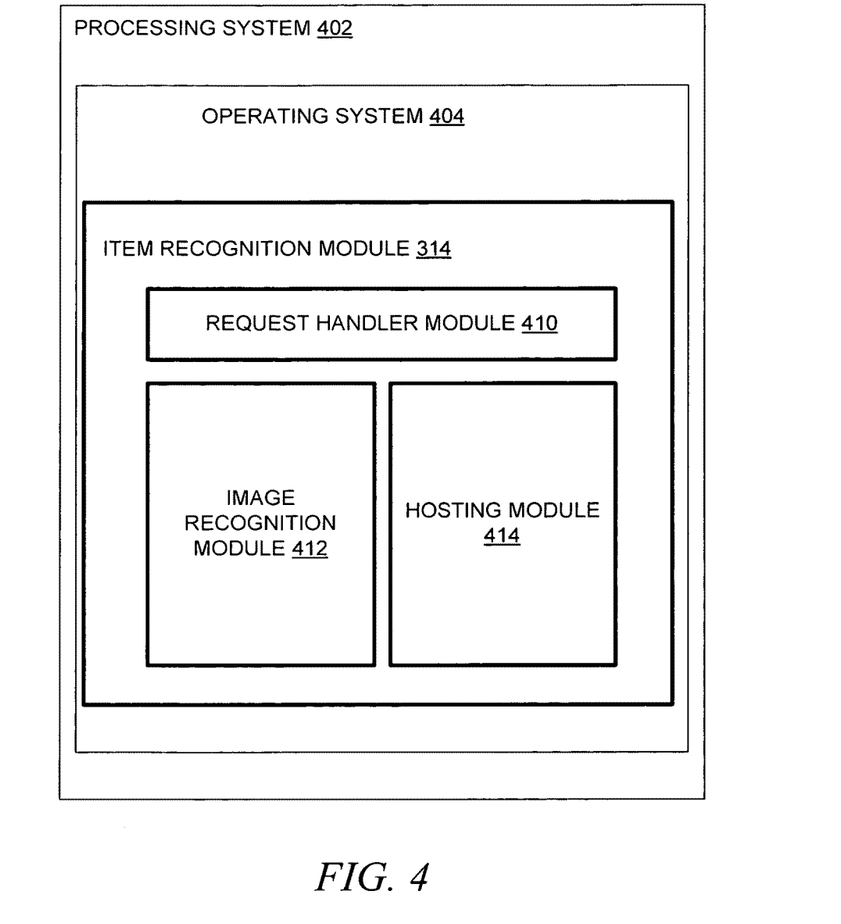
FIG. 4 is a block diagram depicting an item recognition module, in accordance with an illustrative embodiment, included in a processing system that is configured to identify items depicted in images.

FIG. 4 is a block diagram depicting an item recognition module 314, in accordance with an illustrative embodiment, included in a processing system 402 that is configured to identify items depicted in images. It should be appreciated that the processing system 402 may be deployed in the form of variety of computing devices, such as personal computers, laptop computers, server computers, and other computing devices. For example, the processing system 402 may be the server 310 or 312 or the personal computer 304 depicted in FIG. 3. In various embodiments, the processing system 402 may be used to implement computer programs, logic, applications, methods, processes, or other software to identify items depicted in images, as described in more detail below.

The processing system 402 is configured to execute an operating system 404 that manages the software processes and/or services executing on the processing system 402. As depicted in FIG. 4, these software processes and/or services include the item recognition module 314. Generally, the item recognition module 314 is configured to identify one or more items depicted in an image. The item recognition module 314 may include a request handler module 410, an image recognition module 412, and a hosting module 414.

The request handler module 410 is configured to interface with other processing systems, such as the client processing systems 304 and 306 of FIG. 3. The interface may include the receipt of messages and data from other processing systems by way of Hypertext Transfer Protocol (or other protocols), and also include transmission of messages and data from the item recognition module 314 to other processing systems by way of Hypertext Transfer Protocol. Referring to FIG. 4, another processing system in communication with the item recognition module 314 may convert an image into a byte array and open a remote Hypertext Transfer Protocol (HTTP) request to the item recognition module 314. The byte array is written to a server socket using, for example, HTTP POST, and a separate HTTP GET request may be sent, including global positioning system coordinates of the processing system, if available. The request handler module 410 receives the byte array and converts it into, for example, a Java image object that is then processed by the image recognition module 412.

The image recognition module 412 is configured to identify one or more items depicted in an image by comparing the received image with other images of items to identify a match, which is explained in more detail below. The hosting module 414 is configured to interface with other services, which are discussed above. As an example, the image recognition module 412 may transmit a request to a service by way of the hosting module 414 for item data associated with the identified items. This request may include an item identifier, global positioning coordinates, and other information. In turn, the item recognition module 314 receives the requested item data from the service by way of the hosting module 414. The request handler module 410 may then parse the item data from the service into, for example, a lightweight eXtensible Markup Language (XML) for mobile devices and may transmit the response back to the processing systems that originally requested the item data regarding the items depicted in the image.

It should be appreciated that in other embodiments, the processing system 402 may include fewer, more, or different modules apart from those shown in FIG. 4. For example, the image recognition module 412 may be further split into an image recognition module and a neural network module, which are explained in more detail below.

Figure 5:
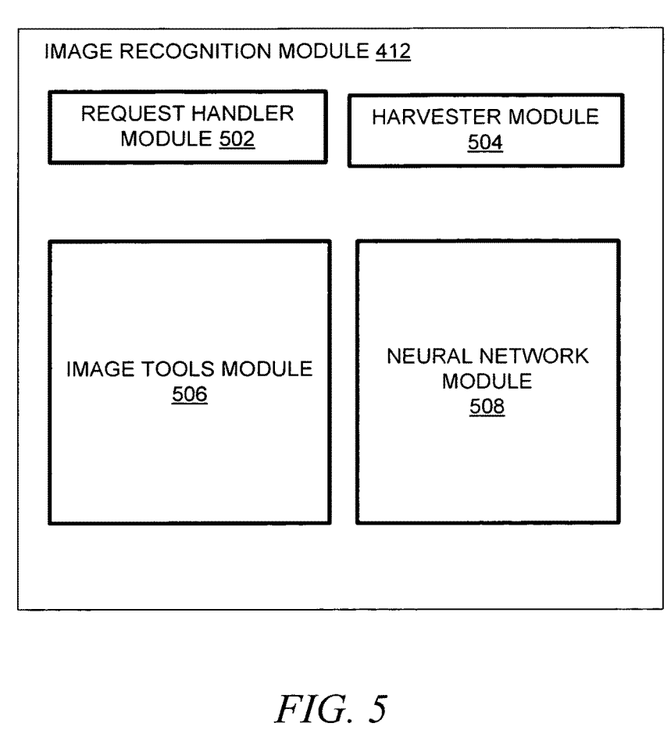
FIG. 5 is a block diagram depicting modules, in accordance with an embodiment, included in the image recognition module.

FIG. 5 is a block diagram depicting modules 502, 504, 506, and 508, in accordance with an embodiment, included in the image recognition module 412. As depicted, the image recognition module 412 includes another request handler module 502, a harvester module 504, an image tools module 506, and a neural network module 508. In general, this other request handler module 502 is configured to process requests made to the image recognition module 412. The image tools module 506 is configured to process the images using one or more image processing algorithms, such as an edge detection algorithm, which is described in more detail below.

Generally, the neural network module 508 is configured to identify one or more items depicted in an image through learning and training. As an example, the neural network module 508 can identify matches between images based on learning algorithms. It should be appreciated that a neural network is a type of computer system that is based generally on the parallel architecture of animal brains and can learn by example. As explained in more detail below, the neural network module 508 gathers representative data and then invokes learning algorithms to learn automatically the structure of the data. A Java Object Oriented Neural Engine is an example of a neural network module 508. Other examples of neural network modules include Feed Forward Neural Networks, Recursive Neural Networks (e.g., Elman and Jordan), Time Delay Neural Networks, Standard Back-Propagation Neural Networks (e.g., Gradient Descent, on-line, and batch), Resilient Back-Propagation (RPROP) Neural Networks, Kohonen Self-Organizing Maps (with WTA or Gaussian output maps), Principal Component Analysis, and Module Neural Networks.

The harvester module 504 is configured to request item data from a service by way of, for example, an API. As described in more detail below, the harvester module 504 may then parse the item data to identify item identifiers and associate the item identifiers with an image.

Figure 6:
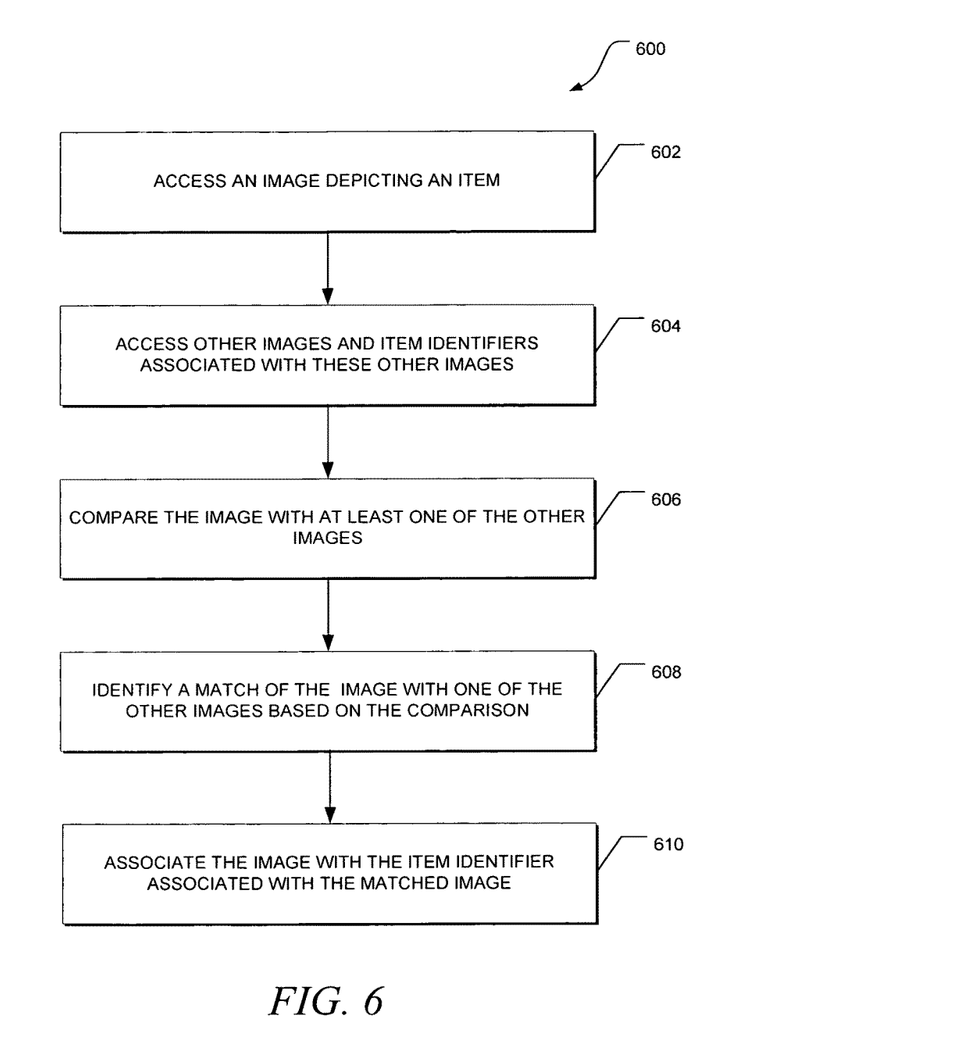
FIG. 6 is a flow diagram depicting a general overview of a method, in accordance with an embodiment, for identifying an item depicted in an image.

FIG. 6 is a flow diagram depicting a general overview of a method 600, in accordance with an embodiment, for identifying an item depicted in an image. In an embodiment, the method 600 may be implemented by the item recognition module 314 and employed in the processing system 402 of FIG. 4. As depicted in FIG. 6, an image depicting an item is accessed at 602. This image may be submitted by a user to identify the item depicted in the image. Additionally, one or more other images and their associated item identifiers, which identify the items depicted in these other images, are accessed at 604. These images and item identifiers may be from user-submitted item postings and are stored in and accessed from a repository of, for example, a network-based publication system. For example, a large number of users place or sell items on an auction website and, when placing or selling these items, the users would submit images and descriptions of the items. All these images and their descriptions, which may be used as item identifiers, may be stored in the repository and are accessible by the item recognition module.

A variety of image identification techniques may be applied to identify the item depicted in the image. As an example, the identification can be based on identifying a match of the image with one of the other images accessed from the repository. In this embodiment, the image is compared with other images at 606, and a match of the image with at least one of the other images is identified at 608 based on the comparison. Once a match is identified, the item identifier associated with the matched image is accessed and the submitted image is associated with the item identifier at 610. Since the item identifier identifies the item depicted in the image, the association effectively results in the identification of the item depicted in the image.

It should be appreciated that a single image may also include multiple items. Each item may be automatically identified or, to assist in the identification, a user may manually point to or designate an approximate location or region of each item in the image as separate items, and the item recognition module can then focus on each designated location to identify a particular item. As a result, for example, if a user wants to list several items for sale, the user can simply take a single picture of all the items and submit the picture in the form of an image to a listing service. The listing service with the item recognition module may then automatically identify and list all the items in the submitted image for sale.

Figure 7:
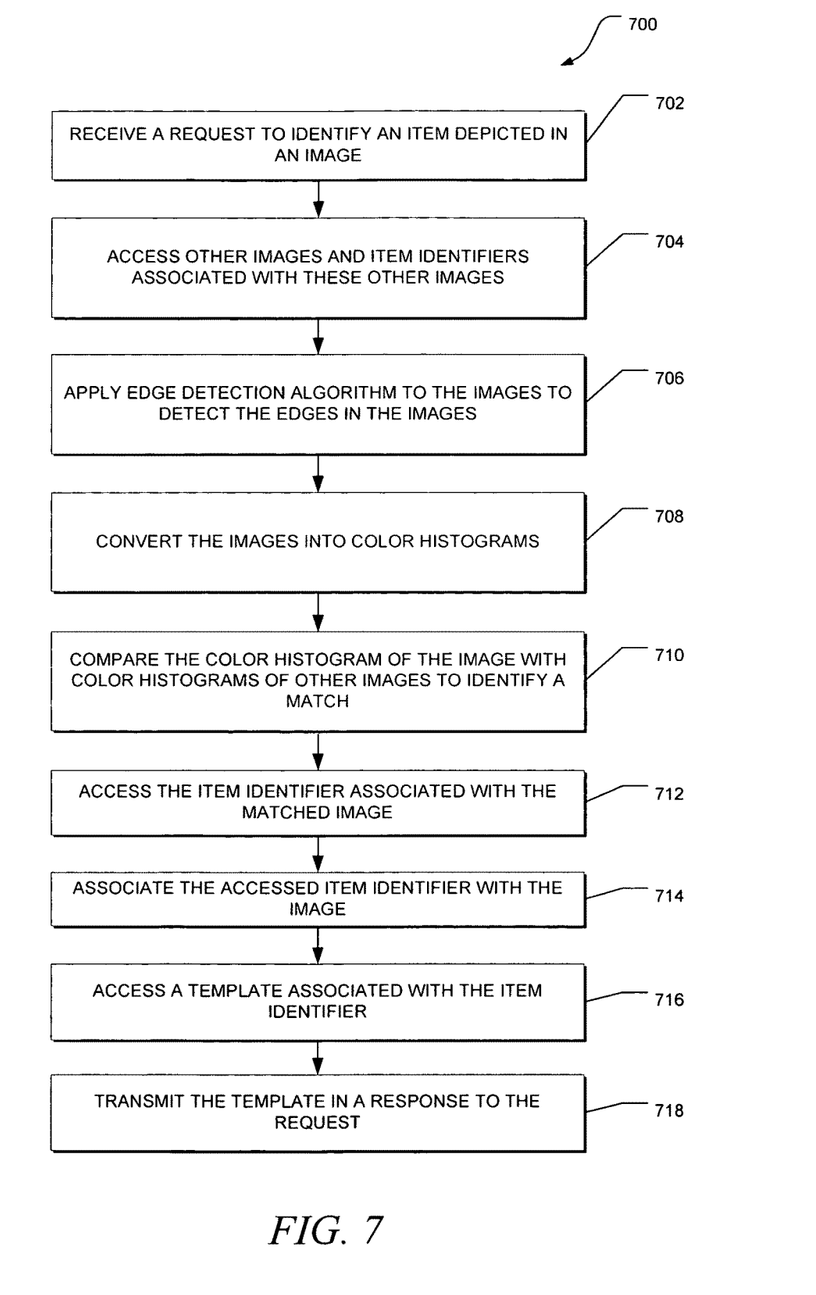
FIG. 7 is a flow diagram depicting a detailed method, in accordance with some embodiments, for identifying an item depicted in an image.

FIG. 7 is a flow diagram depicting a detailed method 700, in accordance with another embodiment, for identifying an item depicted in an image. In the method 700, a request is received to identify an item depicted in an image at 702. This request may, for example, be received from a client processing system and includes an image submitted by a user. Additionally, one or more other images and their associated item identifiers are accessed at 704 from, for example, a repository of a network-based publication system.

In an embodiment, to enhance the accuracy of the subsequent item identification, a variety of different image algorithms can be applied to the images. An example is the application of an edge detection algorithm to the images at 706, in accordance with an alternative embodiment, to detect edges in the images. An image tool module included in the item recognition module, as discussed above, may apply an edge detection algorithm to detect, draw, enhance, or highlight lines, areas, or points of contrast in the image. An example is the application of a Canny edge detector algorithm to extrapolate contrasts of the images. The contrasts effectively serve to highlight the lines, points, or areas that define the item, and the detection of these lines, points, or areas increases the probability of identifying a match between two or more images. Other examples of image algorithms that may be applied to the images include Marching Squares Algorithm and Haar wavelet.

The identification of items depicted in the image can be based on identifying a match of the image with at least one of the other images accessed from the repository. In an embodiment, at 708, the images being compared are converted into color histograms, which are representations of distributions of colors in the images. The color histogram of the image is then compared with the color histograms of the other images at 710 to identify a match. As an example, a neural network module compares the color histograms to generate a statistical analysis of the comparison. The statistical analysis may identify a statistical difference or a statistical similarity between the compared color histograms, and the match is based on the resulting statistical analysis.

The neural network module may then return a set of statistical analysis and associated item identifiers assigned to each set of comparisons. As an example, item identifiers can be correlated with statistical differences using name value pairs, such as "DVD player: .00040040." Here, the item identifier with the smallest correlated error may be the best match based, in part, on training data. As discussed previously, the neural network module can learn from training using examples from previous comparisons. As an example, if a match is identified, the image and its item identifier identified from the match may be warehoused or stored with a large group of images for training the neural network module to make the identification of items more accurate. In another example. a user can manually confirm that a particular item as depicted in an image is accurate, and this confirmation may also be used to develop training for the neural network module.

Once a match is identified, the item identifier associated with the matched image is accessed at 712 and associated with the image being submitted at 714. In the example above, if the item identifier "DVD player" is associated with the matched image from the repository, then the "DVD player" is associated with the image being submitted. It should be appreciated that in addition to the application of the edge detector algorithm and the comparison with other images as discussed above, other image identification processes may also be applied to identify items depicted in the image, in accordance with other embodiments of the invention.

Still referring to FIG. 7, a template associated with the item identifier is accessed at 716, in accordance with an embodiment of the invention. The template may be a pre-built template stored in a data structure and associated with a particular item or item identifier. For example, this template may already include descriptions and attributes of an associated item. The template is then transmitted at 718 in a response to the request. As an example, the template is included in a response and this response is transmitted back to the client processing system that initially requested the identification.

Figure 8:
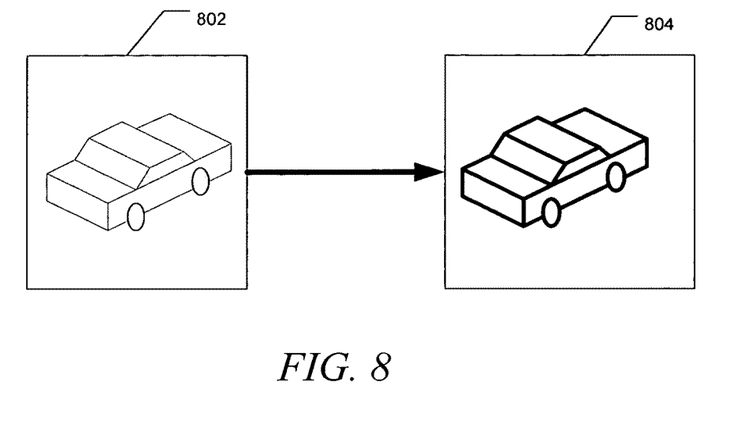
FIGS. 8 and 9 are diagrams depicting a method of identifying an item depicted in an image based on comparisons with other images, in accordance with an illustrative embodiment.
Figure 9:
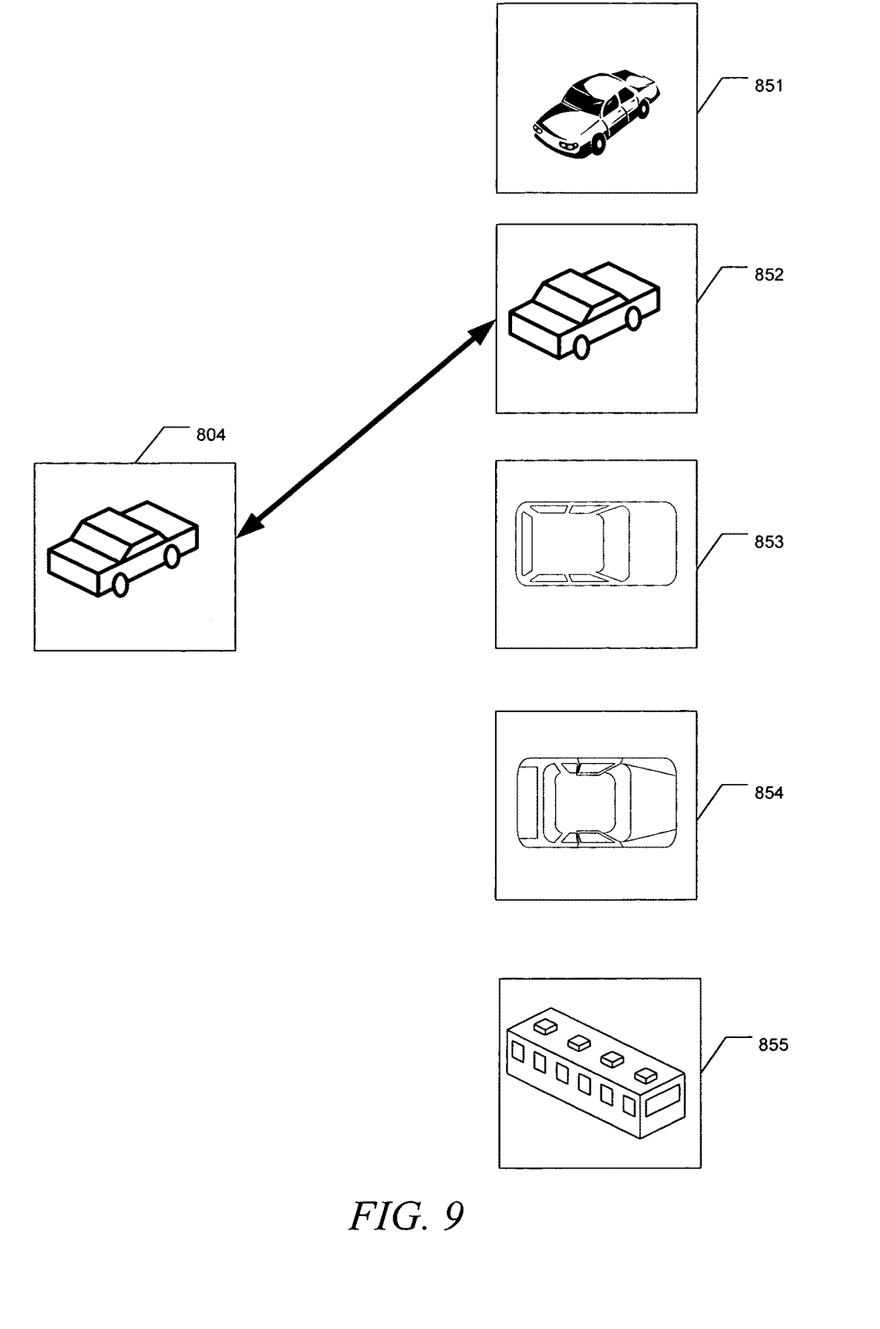

FIGS. 8 and 9 are diagrams depicting a method of identifying an item depicted in an image based on comparisons with other images, in accordance with an illustrative embodiment. As depicted in FIG. 8, a user takes a picture of a car using his mobile phone and submits this picture, in the form of an image 802 to, for example, a listing service that sells cars. Alternatively, the user may take a video of the car and submit one or more frames from the video to the listing service.

An item recognition module hosted with the listing service receives a request to identify the car depicted in the image from the processing system (e.g., a mobile phone) used by the user. This item recognition module has the capability to identify the type of car depicted in the image 802 by identifying a match of the image 802 with at least one other image of a car. Before identification, an edge detection algorithm is applied to the image 802 to produce an image 804 that highlights the lines of the car depicted in the image 802.

As depicted in FIG. 9, a number of other images 851-855 of cars and their associated item data are accessed. In this embodiment. the item identifiers associated with the images 851-855 are not immediately available and instead, the item identifiers are derived from item data associated with the images 851-855. In an embodiment, the item recognition module accesses the item data associated with one or more images 851-855 and then parses the item data to identify one or more item identifiers, which, for example, a user may define as a title or barcode value of an item.

The image 804 thereafter is compared with one or more images 851-855, which may, for example, be extracted from previous listings of cars. In this example, the image 804 is compared with each image 851, 852, 853, 854, and 855 and, for example, a statistical difference between each pair of images (e.g., 804 and 851 or 804 and 852) is generated for each comparison. In the example of FIG. 9, the comparison of the image 804 with the image 852 yields the lowest statistical difference. As a result, a match of the image 804 with the image 852 is identified.

The item identifier associated with the image 852, which is identified from a parsing of the item data, is then associated with the image 802. The item recognition module then transmits the item identifier along with other requested item data (e.g., model and make) in a response to the earlier request back to the processing system used by the user. With a match, the listing service can also automatically place the listing of the car in an appropriate category and then list the car with its image 802 for sale on the website.

Figure 10:
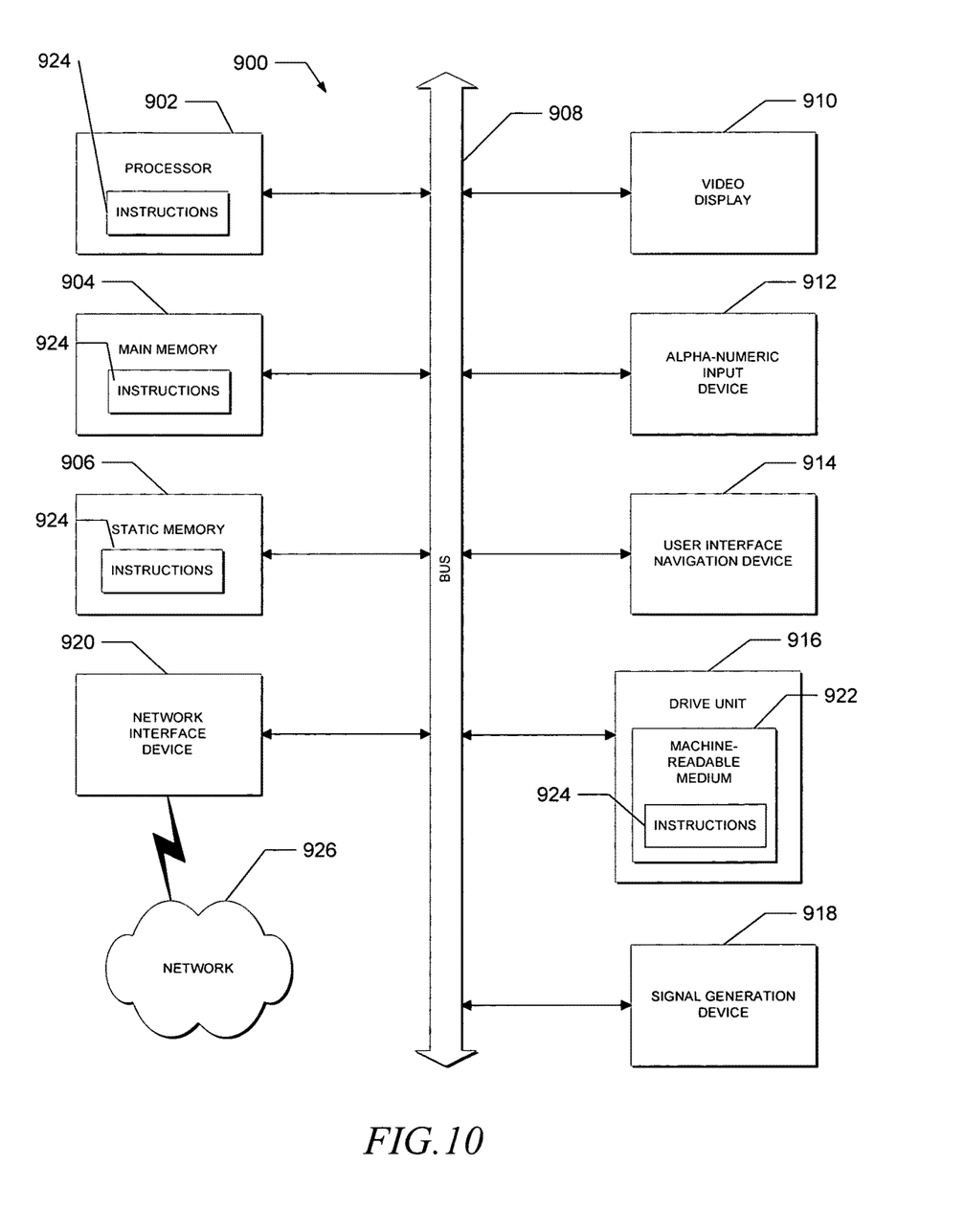
FIG. 10 is a block diagram depicting a machine in the example form of a processing system within which a set of instructions, for causing the machine to perform any one or more of the methodologies discussed herein, may be executed.

FIG. 10 is a block diagram of a machine in the example form of a processing system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 900 includes a processor 902 (e.g., a central processing unit (CPU), a graphics processing unit (GPU) or both), a main memory 904, and static memory 906, which communicate with each other via bus 908. The processing system 900 may further include video display unit 910 (e.g., a plasma display, a liquid crystal display (LCD) or a cathode ray tube (CRT)). The processing system 900 also includes an alphanumeric input device 912 (e.g., a keyboard), a user interface (UI) navigation device 914 (e.g., a mouse), a disk drive unit 916, signal generation device 918 (e.g., a speaker), and network interface device 920.

The disk drive unit 916 includes machine-readable medium 922 on which is stored one or more sets of instructions and data structures 924 (e.g., software) embodying or utilized by any one or more of the methodologies or functions described herein. The instructions and data structures 924 may also reside, completely or at least partially, within main memory 904 and/or within processor 902 during execution thereof by processing system 900, main memory 904, and processor 902 also constituting machine-readable, tangible media.

The instructions and data structures 924 may further be transmitted or received over network 926 via network interface device 920 utilizing any one of a number of well-known transfer protocols (e.g., HTTP).

While the invention(s) is (are) described with reference to various implementations and exploitations, it will be understood that these embodiments are illustrative and that the scope of the invention(s) is not limited to them. In general, techniques for identifying items depicted in images may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of identifying an item depicted in a first image, the method comprising:
   receiving a request to identify the item, the request including the first image;
   accessing a plurality of other images and a plurality of associated item data, the plurality of associated item data including a description in each of a plurality of item listings;
   parsing the plurality of associated item data to identify a plurality of item identifiers associated with the plurality of other images;
   calculating at least one statistical difference between a first color histogram of the first image and a color histogram of each of the plurality of other images;
   determining a second color histogram of a second image as having a lowest calculated statistical difference among the at least one statistical difference between the first color histogram and the color histogram of each of the plurality of other images;
   detecting a first edge in the first image and a second edge in the second image;
   identifying a match of the first color histogram with the second color histogram responsive to determining the second color histogram as having the lowest calculated statistical difference among the at least one statistical difference, the identifying being based on the detection of the first edge in the first image and the second edge in the second image, the second image depicting a second item that corresponds to a barcode among the plurality of item identifiers;
   associating the first image with the barcode that corresponds to the second item depicted in the second image based on the match of the first and second color histograms of the first and second images;
   accessing a template associated with the barcode that corresponds to the second item depicted in the second image based on the match of the first and second color histograms of the first and second images; and
   transmitting the template in a response to the request.

2. The method of claim 1, wherein the identification of the match of the first color histogram with the second color histogram comprises comparing the first image with the second image.

3. The method of claim 1, wherein the identification of the match comprises:
   converting the first image into the first color histogram;
   converting the second image into the second color histogram; and
   comparing the first color histogram with the second color histogram.

4. A non-transitory, machine-readable medium that stores instructions that, when performed by one or more processors of a machine, cause the machine to perform operations comprising:
   accessing a first image depicting an item;
   accessing a plurality of other images and a plurality of associated item data, the plurality of associated item data including a description in each of a plurality of item listings;
   parsing the plurality of associated item data to identify a plurality of item identifiers associated with the plurality of other images;
   calculating at least one statistical difference between a first color histogram of the first image and a color histogram of each of the plurality of other images;
   determine a second color histogram of the second image as having a lowest calculated statistical difference among the at least one statistical difference between the first color histogram and the color histogram of each of the plurality of other images;
   detecting a first edge in the first image and a second edge in the second image;
   identifying a match of the first color histogram with the second color histogram responsive to determining the statistical difference between the first color histogram and the second color histogram as having the lowest statistical difference among the at least one statistical difference, the identifying being based on the detection of the first edge in the first image and the second edge in the second image, the second image depicting a second item that corresponds to a barcode among the plurality of item identifiers;
   associating the first image with the barcode that corresponds to the second item depicted in the second image based on the match of the first and second color histograms of the first and second images, the association identifying the item in the first image; and
   accessing a template associated with the barcode that corresponds to the second item depicted in the second image based on the match of the first and second color histograms of the first and second images.

5. The non-transitory, machine-readable medium of claim 4, wherein the operation of identifying the match of the first color histogram with the second color histogram comprises comparing the first image with the plurality of other images.

6. The non-transitory, machine-readable medium of claim 4, wherein the operation of identifying the match comprises:
   converting the first image into the first color histogram;
   converting the second image into the second color histogram; and comparing the first color histogram with the second color histogram.

7. The non-transitory, machine-readable medium of claim 4, wherein the instructions, when performed by a machine, cause the machine to perform operations further comprising:
receiving a request to identify the item depicted in the first image;
accessing a plurality of item data associated with the item identifier that corresponds to the second image; and
transmitting a response to the request, the response including the plurality of item data and the item identifier that corresponds to the second image.

8. The non-transitory, machine-readable medium of claim 7, wherein the plurality of item data associated with the item identifier that corresponds to the second image includes a description of the item.

9. The non-transitory, machine-readable medium of claim 7, wherein the plurality of item data associated with the item identifier that corresponds to the second image includes a location of the item.

10. The non-transitory, machine-readable medium of claim 4, wherein the edge detection algorithm is a Canny edge detector algorithm.

11. A processing system comprising:
at least one processor; and
a memory in communication with the at least one processor, the memory being configured to store an item recognition module that is executable by the at least one processor, the item recognition module having instructions, that when executed by the at least one processor, cause operations to be performed, the operations comprising:
accessing a first image depicting an item;
accessing a plurality of other images and a plurality of associated item data, the plurality of associated item data including a description in each of a plurality of item listings;
parsing the plurality of associated item data to identify a plurality of item identifiers associated with the plurality of other images;
calculating at least one statistical difference between a first color histogram of the first image and a color histogram of each of the plurality of other images;
determining a second color histogram of a second image as having a lowest calculated statistical difference among the at least one statistical difference between the first color histogram and the color histogram of each of the plurality of other images;
detecting a first edge in the first image and a second edge in the second image;
identifying a match of the first color histogram with the second color histogram responsive to determining the second color histogram as having the lowest calculated statistical difference among the at least one statistical difference, the identifying being based on the detection of the first edge in the first image and the second edge in the second image, the second image depicting a second item that corresponds to a barcode among the plurality of item identifiers;
associating the first image with the barcode that corresponds to the second item depicted in the second image based on the match of the first and second color histograms of the first and second images; and accessing a template associated with the barcode that corresponds to the second item depicted in the second image based on the match of the first and second color histograms of the first and second images.

12. The processing system of claim 11, wherein the item recognition module includes a neural network module that is executable by the at least one processor, wherein the neural network module has instructions that, when executed by the at least one processor, cause operations to be performed, comprising to identifying the match of the first image with the second image based on a learning algorithm.

13. The processing system of claim 11, wherein the operation of identifying the match comprises:
converting the first image into the first color histogram;
converting the second image into the second color histogram;
comparing the first color histogram with the second color histogram.

14. An apparatus comprising:
one or more processors and executable instructions accessible on a computer-readable medium that, when executed, configure the one or more processors to at least:
receive a request to identify the item, the request including the first image, to access a plurality of other images and a plurality of associated item data, the plurality of item data including a description in each of a plurality of item listings, and to further parse the plurality of associated item data to identify a plurality of item identifiers associated with the plurality of other images;
calculate at least one statistical difference between a first color histogram of the first image and a color histogram of each of the plurality of other images, and to determine a second color histogram of a second image as having a lowest calculated statistical difference among the at least one statistical difference between the first color histogram and the color histogram of each of the plurality of other images;
detect a first edge in the first image and a second edge in the second image;
identify a match of the first color histogram with the second color histogram responsive to determining the second color histogram as having the lowest calculated statistical difference among the at least one statistical difference, the identifying being based on the detection of the first edge in the first image and the second edge in the second image, the second image depicting a second item that corresponds to a barcode among the plurality of item identifiers;
associate the first image with the barcode that corresponds to the second item depicted in the second image based on the match of the first and second color histograms, the association identifying the item in the image; and
access a template associated with the barcode that corresponds to the second item depicted in the second image based on the match of the first and second color histograms of the first and second images, and to transmit the template in a response to the request.

15. The apparatus of claim 14, wherein the plurality of other images are submitted by a plurality of users.

* * * * *